(12) United States Patent
Keesara et al.

(10) Patent No.: US 9,137,101 B2
(45) Date of Patent: Sep. 15, 2015

(54) MULTI-LAYER NETWORK DIAGNOSTIC TRACING

(75) Inventors: Srikanth Keesara, Tewksbury, MA (US); David E. Frattura, Boston, MA (US); Deborah E. Fitzgerald, Acton, MA (US); Christopher Monti, Tyngsboro, MA (US)

(73) Assignee: AVAYA INC., Basking Ridge, NJ (US)

( * ) Notice: Subject to any disclaimer, the term of this patent is extended or adjusted under 35 U.S.C. 154(b) by 385 days.

(21) Appl. No.: 13/303,615

(22) Filed: Nov. 23, 2011

(65) Prior Publication Data

US 2013/0128751 A1 May 23, 2013

(51) Int. Cl.
*G01R 31/08* (2006.01)
*H04L 12/24* (2006.01)
*H04L 12/26* (2006.01)
*H04L 12/721* (2013.01)

(52) U.S. Cl.
CPC ........ *H04L 41/0677* (2013.01); *H04L 43/0811* (2013.01); *H04L 43/10* (2013.01); *H04L 45/70* (2013.01)

(58) Field of Classification Search
USPC ......... 370/390, 389, 392, 256, 252, 312, 401, 370/216, 218, 222, 225, 248, 352, 355, 400, 370/402, 404, 408, 432; 714/4.3, 716, 717
See application file for complete search history.

(56) References Cited

U.S. PATENT DOCUMENTS

| | | | |
|---|---|---|---|
| 6,853,639 B1 * | 2/2005 | Watanuki et al. | 370/390 |
| 7,639,683 B2 * | 12/2009 | Uchiyama et al. | 370/390 |
| 7,945,656 B1 * | 5/2011 | Remaker | 709/224 |
| 2005/0099955 A1 * | 5/2005 | Mohan et al. | 370/242 |
| 2007/0008982 A1 * | 1/2007 | Voit et al. | 370/401 |
| 2007/0025256 A1 * | 2/2007 | Hertoghs et al. | 370/236.2 |
| 2009/0113070 A1 * | 4/2009 | Mehta et al. | 709/238 |
| 2012/0113817 A1 * | 5/2012 | Fitzgerald et al. | 370/248 |
| 2013/0128751 A1 * | 5/2013 | Keesara et al. | 370/248 |
| 2013/0265881 A1 * | 10/2013 | Filsfils et al. | 370/241 |

* cited by examiner

*Primary Examiner* — Phuongchau Ba Nguyen
(74) *Attorney, Agent, or Firm* — Anderson Gorecki & Rouille LLP

(57) ABSTRACT

A network management and monitoring application employs diagnostic messages for confirming network path connectivity and identifying and locating connectivity faults. Diagnostic messages similar to conventional "ping" and "traceroute" messages traverse the network along a prescribed path for which diagnostic feedback is desired. The application receives and analyzes return messages sent from network entities along the path to ascertain connectivity issues on the path. The application receives layer 3 identifiers such as IP addresses, however performs diagnostic operations such as continuity checks based on layer 2 identifiers such as MAC (Media Access Control) identifiers because certain network entities operate on L2 identifiers and would otherwise evade a continuity check based on layer 3 identifiers. The monitoring application therefore performs continuity diagnostics such as ping and traceroute operations using L2 identifiers, therefore pinpointing problems with an L2 network forwarding entity such as a bridge that lies between L3 entities such as routers.

20 Claims, 3 Drawing Sheets

MULTI-LAYER NETWORK DIAGNOSTIC TRACING

BACKGROUND

Modern computer networks strive for transparency of the physical network. Various utilities and applications are available for providing a user with a similar login experience regardless of location, enabling trends such as telecommuting and virtual private networks (VPNs). In a Virtual Local Area Network (VLAN), for example, users in distinct physical networks employ transport services that appear to be part of the same LAN. The IEEE 802.1aq standard of Shortest Path Bridging (SPB) networks extends the well entrenched Ethernet approach for accommodating virtual LANs and wireless transport. Multiple paths coexist such that a shortest path with minimal latency is automatically created and if there is a failure of a link or switch, the failover time is minimal. SPB also removes the complexity of manual VLAN extensions and avoids the somewhat cumbersome spanning tree protocol.

In an SPBM network, mechanisms are employed to debug connectivity issues and to isolate faults. Utilities and applications such as Connectivity Fault Management (CFM) are often employed for performing network management tasks for assessing and maintaining network health. Such utilities interrogate, report and assist in the diagnosis of connectivity and network path management operations, typically at the bequest of a network operator charged with maintenance of these networks.

SUMMARY

A network management and monitoring application employs diagnostic messages for confirming network path connectivity and identifying and locating connectivity faults. Diagnostic messages similar to conventional "ping" and "traceroute" messages traverse the network along a prescribed path for which diagnostic feedback is desired. The monitoring application receives and analyzes return messages sent from network entities along the path to ascertain connectivity issues on the path. The application receives layer 3 (L3) identifiers such as IP addresses, however performs diagnostic operations such as continuity checks based on both layer 3 (L3) identifiers (i.e. IP addresses) and layer 2 (L2) identifiers such as MAC (Media Access Control) identifiers because certain network entities (i.e. bridges) operate on L2 identifiers and would otherwise evade a continuity check based on layer 3 identifiers. The monitoring application therefore interfaces with users via layer 3 identifiers, which are often less cumbersome and readily identifiable by inspection than their L2 counterparts, however performs continuity diagnostics such as ping and traceroute operations using L2 identifiers, therefore pinpointing problems with an L2 network forwarding entity such as a bridge that lies between L3 entities such as routers.

Routers and end stations in a L3 routed network typically employ ICMP (Internet Control Message Protocol) to help isolate faults in the network. Conventional ICMP is a communication protocol between IP protocol implementations on two connected systems. L2 Bridged Ethernet based L2 networks use CFM (defined in IEEE 802.1ag) to isolate and detect faults within the portion of the network that uses Ethernet Bridging. However, Connectivity Fault Management (CFM) operates at Layer 2 and provides an equivalent of conventional ping and traceroute. In a network having forwarding entities including L3 routers, L2 bridges and hybrid L2/L3 bridge router, packets are forwarded by using L3/IP based routing decisions on routers (and at the routing layer of the hybrid bridge router) and L2/MAC address based bridging decisions on bridges (and at the bridging layer of a hybrid bridge router).

When network devices such as these forwarding entities drop or misdirect packets, users of the network experience service disruption. The network operator has to be able to isolate the location of the fault quickly in order to correctly diagnose the fault as well as take corrective actions to restore service.

Configurations herein are based, in part, on the observation that conventional network management and monitoring applications operate only at a particular network layer (i.e. L2 or L3), and therefore cannot provide comprehensive diagnostic feedback concerning a network path spanning network entities of both L2 and L3 domains. Conventional approaches suffer from the shortcoming that MAC address (L2) entities may evade a connectivity diagnostic operation of L3 entities. In conventional L3 based network management, ICMP based PING and TRACEROUTE commands identify the routers which are reachable and those that are not. But if path between two routers is through a set of L2 Bridges and the packets are being dropped at one of the Bridges, ICMP cannot determine which Bridge is dropping the packets.

CFM based troubleshooting can determine which bridge among the set of bridges between a pair of router is dropping the traffic. However, CFM based tools require the users to specify MAC addresses as command line arguments. This is fairly tedious and error prone. Configurations herein substantially overcome these shortcomings by providing a set of tools/commands that take traditional ICMP command line parameters and automatically apply them to a CFM based troubleshooting tools.

In further detail, configurations herein provide a network diagnostic monitoring application for transmitting diagnostic messages to network entities (forwarding entities) responsive to either L2 or L3 diagnostic messages. In the examples herein, the forwarding entities include routers having assigned network identifiers and bridges having static device identifiers, and perform a method for transmitting diagnostic messages including receiving a network identifier, such as an IP address, corresponding to a destination entity to which a diagnostic path evaluation is requested, such that the network identifier identifying a network entity reachable by the path, and determine a device identifier corresponding to a forwarding entity defining a next hop on the path, in which the device identifier is independent of the existence of a network identifier corresponding to the forwarding entity. The monitoring application transmits diagnostic messages addressed to the determined device identifier for receiving a return message indicative of continuity of the path to the forwarding entity, and determines, based on received return messages, whether continuity exists on the path to the network entity. Typically the diagnostic messages are limited by a TTL (Time to Live) field and/or a number of network "hops," following which a return message is sent to confirm connectivity to that point on the path.

Alternate configurations of the invention include a multi-programming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Depicted below is an example configuration of a networking environment suitable for use with configurations disclosed herein. An example network such as an SPBM network employs a monitoring application responsive to a network operator for issuing diagnostic commands that result in diagnostic messages sent by the monitoring application to network entities (forwarding entities) on a path for which diagnostic continuity information is sought. In contrast to conventional approaches, which require specific interrogation of L2 entities using cryptic L2 (MAC) labels, configurations herein receive L3 identifiers such as IP addresses, allowing a more intuitive and less error prone user invocation.

Conventional approaches require an operator to enter MAC addresses on command line parameters, often requiring manual mapping of network entities and is often a tedious process. Other conventional approaches include tracing the Layer-2 identifier to an IP address—which takes source and destination IP addresses as parameters, however typically rely on a proprietary protocol or do not conform to IEEE standards as does CFM. Such conventional approaches often only work for directly attached networks. This precondition suggests that the source and destination IP addresses should be in the same network and that the switch or router be able to resolve the ARP for the destination IP. Accordingly, such an approach cannot be used directly on IP addresses that are reachable via the route table but are reachable through a next-hop router (not directly attached networks). For such cases, this approach requires the user to check the route table to find the next-hop IP and then issue the corresponding proprietary command to check the L2 path to the next-hop IP address. Further, such conventional approaches often do not support the case of ECMP (Equal Cost MultiPath) routes, and cannot test reachability (ping) without also testing traceroute.

CFM applicability is beneficial because CFM is based on the IEEE 802.1ag standard. IEEE 802.1ag Connectivity Fault Management (CFM) provides OAM tools for the service layer, which allows you to monitor and troubleshoot an end-to-end Ethernet service instance. CFM is the standard for Layer 2 ping, Layer 2 traceroute, and the end-to-end connectivity check of the Ethernet network.

Figure 1:
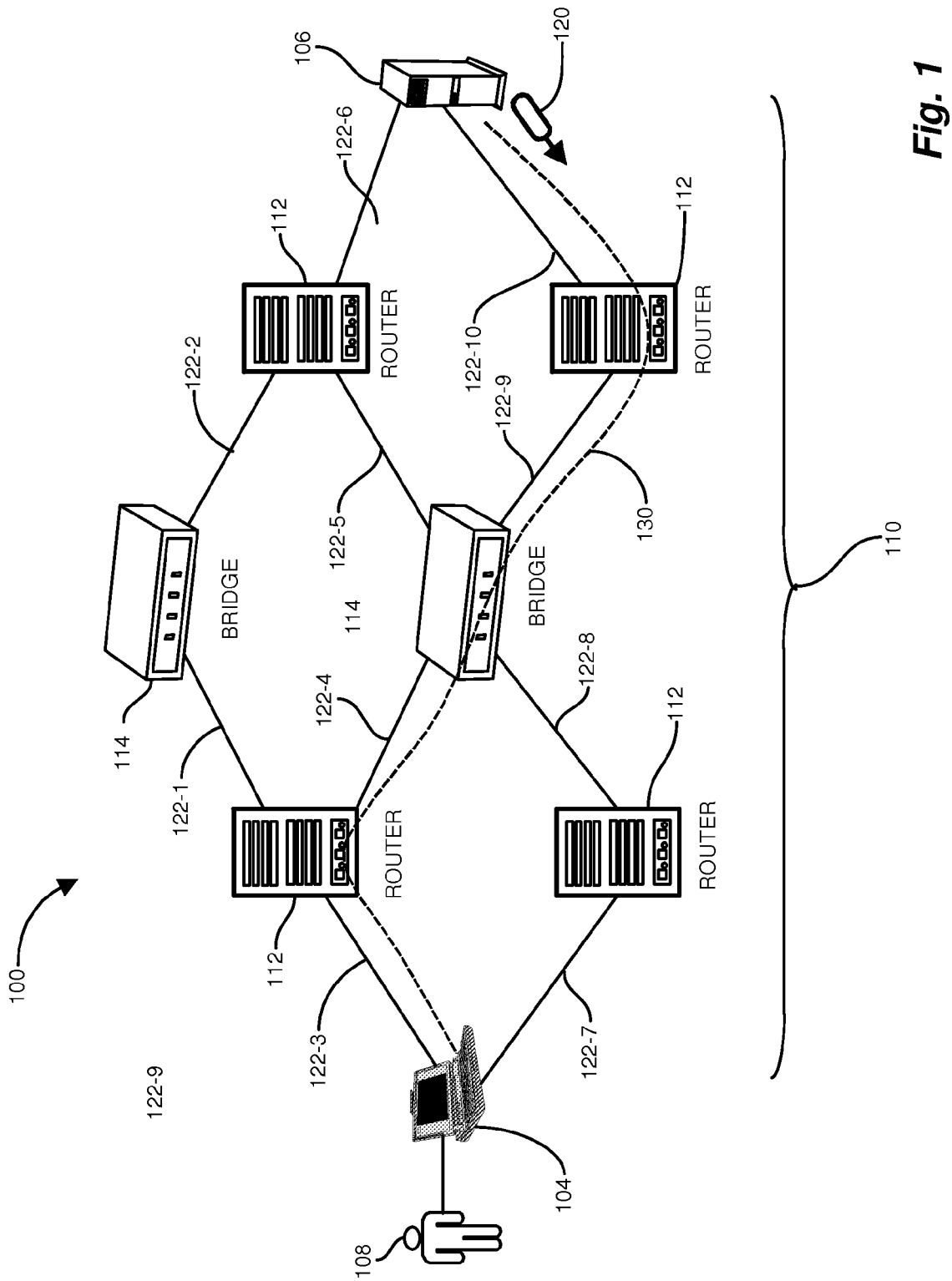
FIG. 1 is a context diagram of a SPB (Shortest Path Bridging) network suitable for use with configurations disclosed herein.

Referring to FIG. 1, a network environment 100 includes user and service entities, such as user stations 104 and servers 106, interconnected by a plurality of network entities 110, such as routers 112 and bridges 114. The user station 104 is responsive to a user 108 for providing a service or application from the server 106 via the network entities 110 (forwarding entities). The service is provided by packets 120, which traverse the network entities 110 via interconnections 122-1 . . . 122-10 (122 generally) between the network entities 110. A set of interconnections 122 between a source, such as the service 106, and a destination, such as the user station 104, defines a path 130 between the source and destination. Each packet follows a path, however there may be more than one path between network entities 110, and hence, multiple paths between a particular source and destination. Further, it should be noted that the mnemonics of source and destination are exemplary, and typical network usage involves bi-directional interconnections for communicating between the user station 104 and server 106, each taking respective roles of a source and destination depending on the packet 120 flow.

Figure 2:
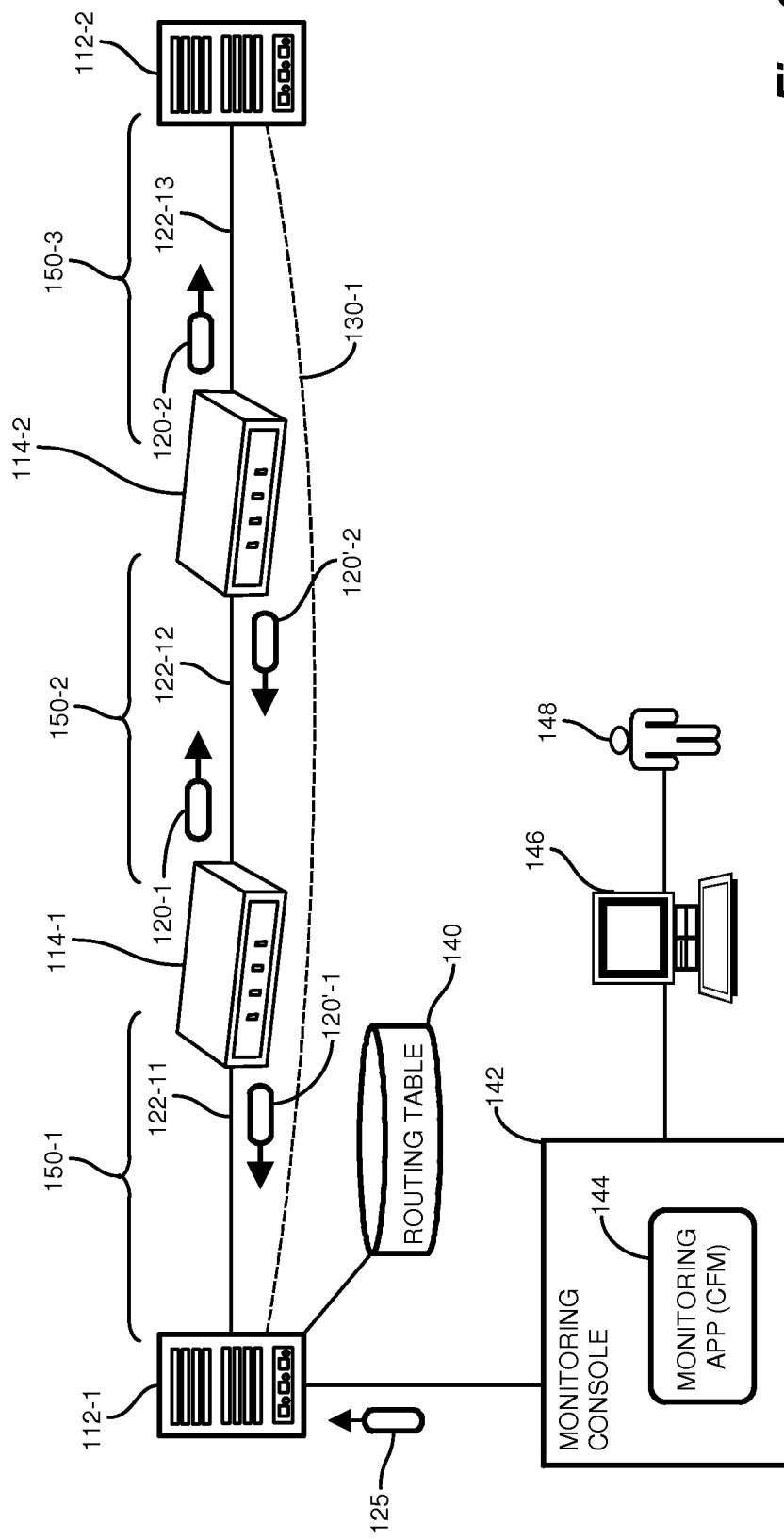
FIG. 2 is a block diagram of a network segment in the network of FIG. 1.

FIG. 2 is a block diagram of a network segment in the network environment of FIG. 1. Referring to FIGS. 1 and 2, a network path 130-1 includes multiple network segments 150-1 . . . 150-3 (150 generally), each defined by an interconnection 122-11 . . . 122-13 between network entities 110. Each of the network entities 110 is a forwarding point from which each packet 120 is forwarded on a particular segment 150 based on the interconnection 122 leading to the destination 106, typically called a "next hop." A routing table 140 defines, for each destination, a corresponding next hop. Each network entity 110 maintains a copy of the routing table 140 pertaining to network entities it accesses. A monitoring console 142 executes the monitoring application 144 for assessing the health, or status, of the network interconnections 122. A network operator 148 employs the monitoring application 144 for assessing network status and rendering a report on rendering device 146, typically a video monitor.

As indicated above, the network entities 110 forward based on either network identifiers, such as IP addresses, or device identifiers such as MAC IDs. However, a conventional trace message 125 (responsive to a trace command from the operator 148) identifies layer 3 network entities based on the network identifier. Intervening layer 2 entities, such as bridges 114, forward but do not acknowledge the conventional trace operation. In configurations herein, the bridges 114 both forward 120-1, 120-2 the traffic packets, and send a corresponding L2 trace response 120'-1, 120'-2, back to the monitoring application 144 from which the trace 125 emanated from. Accordingly, the monitoring application 144 identifies not only the path segment 130-1 between the routers 112 on the path, but also the network segments 150 between individual bridges 114 or other layer 2 entities, for identifying the network interconnection 122 experiencing continuity issues.

Figure 3:
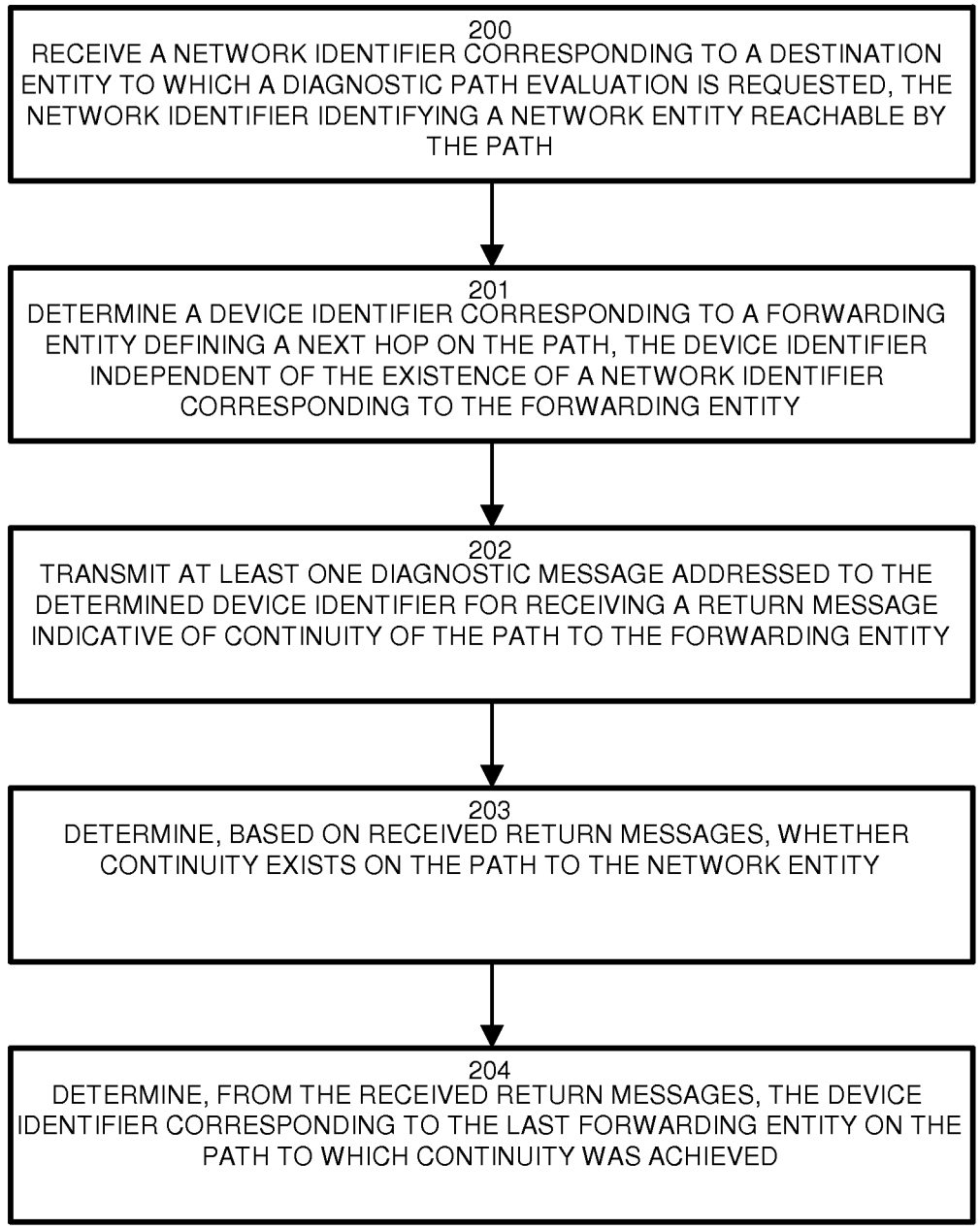
FIG. 3 is a flowchart of network operation according to configurations herein.

FIG. 3 is a flowchart of network operation according to configurations herein. Referring to FIGS. 1-3, at step 200, in the network switching environment 100 having a switch fabric of forwarding entities 110, in which the forwarding entities include routers 112 having assigned network identifiers (e.g. IP address) and bridges 114 having static device identifiers (e.g. MAC address), the method for transmitting diagnostic messages as defined herein includes receiving a network identifier corresponding to a destination entity 106 to which a diagnostic path evaluation is requested, in which the network identifier identifies a network entity reachable by the path 130. In the example arrangement, this is an IP address (either an IPv4 or IPv6 designator) assigned by the network administration. A forwarding entity 110 (router 112 or switch 114) determines a device identifier corresponding to a forwarding entity 110 defining a next hop on the path 130, as depicted at step 201, such that the device identifier is independent of the existence of a network identifier corresponding to the forwarding entity. Thus, the L3 identifier employs an arbitrary mapping to a corresponding L2 identifier for the same network entity 110. In the example configuration, the device identifier is a MAC address intrinsic to the hardware device and the network identifier is an IP address assigned by network administration. The bridges 114 operate on a layer 2 (L2) identifier such as a MAC address, and are not concerned with a device identifier such as an IP address, which is a layer 3 (L3) label. The routers 112, in contrast, operate on L3 addresses such as IP addresses and perform a lookup or mapping to identify the forwarding MAC address.

In the example arrangement disclosed, determining the next hop device identifier includes performing a lookup of network identifiers indicating successive forwarding entities 110 on the path 130, and computing a device identifier corresponding to the network identifier. In the case of a router 112, determining the device identifier further includes performing a layer 3 (L3) lookup, and determining, from the layer 3 lookup, the layer 2 (L2) entity corresponding to the 13 forwarding entity returned from the lookup. This may involve performing an Address Resolution Protocol (ARP) lookup to identify a L2 identifier associated with an L3 route, such that the ARP lookup accesses a mapping of IP addresses to Ethernet device identifiers such as MAC addresses.

Address Resolution Protocol (ARP) permits correlation between the IP and Ethernet networking layers. Since networking hardware such as switches, hubs, and bridges operate on Ethernet frames, they are unaware of the higher layer data carried by these frames. Similarly, IP layer devices, operating on IP packets, need to be able to transmit their IP data on Ethernets. ARP defines the conversation by which IP capable hosts can exchange mappings of their Ethernet and IP addressing. ARP therefore defines the exchanges between network interfaces connected to an Ethernet media segment in order to map an IP address to a link layer address on demand. Link layer addresses are hardware addresses (although they are not immutable) on Ethernet cards and IP addresses are logical addresses assigned to machines attached to the Ethernet. Link layer addresses may be known by many different names: Ethernet addresses, Media Access Control (MAC) addresses, and even hardware addresses. Nevertheless, these terms are not realistically distinct and can generally be used interchangeably.

The monitoring application 144, in sending the trace messages 120, determines if a next hop on the path 130 to the destination entity 106 is a bridge 114 having layer 2 forwarding capability based on a device identifier, or a router 112 having layer 3 forwarding capability based on a network identifier. In the case of the next hop forwarding entity 110 being a L2 entity such as a bridge 112, determining the next hop device identifier may further include performing a lookup based on an IP address. The monitoring application 144 determines that the next hop forwarding entity 110 is referenced only by a device identifier (IP address), and receives the device identifier as the next hop on the path 130. Alternatively, in the case where the device identifier of the forwarding entity 110 defining the next hop is a MAC address, determining the device identifier may include a layer 2 lookup in an ARP database.

In particular arrangements, such as in SPB networks, multiple available paths to the destination entity exist, and determining the next hop includes identifying the next hop on each of the available paths for identifying any available path continuity, since the destination entity 106 would be reachable on alternate, although not necessarily optimal, paths.

The monitoring application 144, in assessing continuity, transmits a series of the above-described diagnostic messages 120 addressed to the determined device identifier, such as the IP address for the destination 106, for receiving a return message 120' indicative of continuity of the path to the forwarding entity 110, as depicted at step 202. Each of the diagnostic messages 120 evokes a return message 120' from a particular forwarding entity on the path 130, depending on whether the forwarding entity 110 is a L2 or L3 device. Typically, an L3 link trace message such as an ICMP based ping or traceroute employs a TTL (time to live field) to send increasing hop count messages, for which each message is forwarded or replied to with a response, depending on whether the hop count has expired. For layer 2 entities, a link trace message (LTM) and link trace response (LTR) typically forward and respond (ack) at each hop.

The monitoring application 144 determines, based on received return messages 120', whether continuity exists on the path 130 to the network entity 106, as disclosed at step 203. If the received return messages 120' indicate a loss of continuity on the path, the monitoring application 144 determines, from the last return message 120' received, the network location of the loss of continuity. This may include determining, from the received return messages 120', the device identifier corresponding to the last forwarding entity on the path 130 to which continuity was achieved, as disclosed at step 204. Each forwarding entity 110 on the path 130 elicits a return message 120. In contrast to conventional link trace messages, L2 entities such as bridges 114 also return a message 120,' allowing determination of which segment 150 between bridges 114 is responsible for the loss in continuity, rather than simply the router 112 endpoints (which, in the example shown, would not pinpoint which of segments 150-1 . . . 150-3 encountered difficulty.

In an example approach, commands and messages employed via the monitoring application 144 may include the following:

12ping <ipaddress>:

1. The user specifies an IP address (either IPv4 or IPv6) instead of a MAC as a command line argument.

2. The command is delivered to the CFM module.

3. a CFM Module in the monitoring application 144 performs a L3 IP Route Table Lookup and obtains the MAC address of the Next-Hop Router or Host (if it is a directly attached network). This may sometimes involve doing an IP lookup followed by a ARP Lookup.

4. CFM Module triggers the LOOPBACK feature within CFM to test reachability to the MAC address for the Next-Hop.

5. For the case where IP ECMP is in use—CFM Module repeats the steps 3 and 4 above to test L2 reachability to all the possible Next-Hop choices.

12traceroute <ipaddress>:
1. The user specifies an IP address instead of a MAC as a command line argument.
2. The command is delivered to the CFM module.
3. CFM Module performs a L3 IP Route Table Lookup and obtains the MAC address of the Next-Hop Router or Host (if it is a directly attached network). This may sometimes involve doing a IP lookup followed by a ARP Lookup.
4. CFM Module triggers the LINKTRACE feature within CFM to trace the L2 path until the Next-Hop IP.
5. For the case where IP ECMP is in use—CFM Module repeats the steps 3 and 4 above to test L2 reachability to all the possible Next-Hop choices.

Those skilled in the art should readily appreciate that the programs and methods for performing multicast multi-layer diagnostic tracing as defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method of performing multi-layer diagnostic tracing has been particularly shown and described with references to embodiments thereof, it will be understood by those skilled in the art that various changes in form and details may be made therein without departing from the scope of the invention encompassed by the appended claims.

What is claimed is:

1. In a network switching environment having a switch fabric of forwarding entities, the forwarding entities including routers having an assigned network identifiers and bridges having static device identifiers, a method for transmitting diagnostic messages comprising:
   receiving a Layer 3 (L3) network identifier corresponding to a destination entity to which a diagnostic path evaluation is requested, the network identifier identifying a network entity reachable by the path;
   determining a Layer 2 (L2) device identifier corresponding to a forwarding entity defining a next hop on the path, wherein determining the next hop device identifier comprises:
      performing a lookup of network identifiers indicating successive forwarding entities on the path; and
      computing a device identifier corresponding to the network identifier, wherein each device having an L3 identifier is given a respective L2 identifier such that all L2 devices and L3 devices have a device identifier;
   transmitting only a single diagnostic message addressed to the determined device identifier for receiving a return message indicative of continuity of the path to the forwarding entity; and
   determining, based on received return messages, whether continuity exists on the path to the network entity.

2. The method of claim 1 further comprising, if the received return messages indicate a loss of continuity on the path, determining, from the last return message received, the network location of the loss of continuity.

3. The method of claim 2 further comprising, determining, from the received return messages, the device identifier corresponding to the last forwarding entity on the path to which continuity was achieved.

4. The method of claim 1 wherein determining the next hop device identifier further comprises:
   performing a lookup based on an IP address;
   determining that the next hop forwarding entity is referenced only by a device identifier; and
   receiving the device identifier as the next hop on the path.

5. The method of claim 4 further comprising determining if a next hop on the path to the destination entity is:
   a bridge having layer 2 forwarding capability based on a device identifier; or
   a router having layer 3 forwarding capability based on a network identifier.

6. The method of claim 5 wherein the device identifier of the forwarding entity defining the next hop is a MAC address and determining the device identifier includes a layer 2 lookup in an ARP database.

7. The method of claim 1 wherein multiple available paths to the destination entity exist, and determining the next hop includes identifying the next hop on each of the available paths for identifying any available path continuity.

8. The method of claim 1 wherein determining the device identifier further comprises:
   performing a layer 3 (L3) lookup; and
   determining, from the layer 3 lookup, the layer 2 (L2) entity corresponding to the L3 forwarding entity returned from the lookup.

9. The method of claim 8 further comprising performing an Address Resolution Protocol (ARP) lookup to identify a L2 identifier associated with an L3 route, the ARP lookup accessing a mapping of IP addresses to Ethernet device identifiers.

10. The method of claim 1 wherein said determining the device identifier includes using an arbitrary mapping of an L3 identifier to a corresponding L2 identifier.

11. A network management server for performing diagnostic monitoring comprising:
   a processor responsive to instructions for sending and receiving messages;
   an interface to a network of interconnected forwarding entities including routers having an assigned Layer 3 (L3) network identifiers and bridges having static Layer 2 (L2) device identifiers;
   a management console for receiving a network identifier corresponding to a destination entity to which a diagnostic path evaluation is requested, the network identifier identifying a network entity reachable by the path; and
   a monitoring application for determining a device identifier corresponding to a forwarding entity defining a next hop on the path, wherein determining the next hop device identifier comprises:
      performing a lookup of network identifiers indicating successive forwarding entities on the path; and
      computing a device identifier corresponding to the network identifier, wherein each device having an L3 identifier is given a respective L2 identifier such that all L2 devices and L3 devices have a device identifier;

the management application configured to transmit only a single diagnostic message addressed to the determined device identifier for receiving a return message indicative of continuity of the path to the forwarding entity, and determine, based on received return messages, whether continuity exists on the path to the network entity.

12. The server of claim 11 wherein the management application is configured to:
   determine if the received return messages indicate a loss of continuity on the path; and
   determine, from the last return message received, the network location of the loss of continuity.

13. The server of claim 12 wherein the management application is further configured to determine, from the received return messages, the device identifier corresponding to the last forwarding entity on the path to which continuity was achieved.

14. The server of claim 11 wherein determining the next hop device identifier further comprises:
   performing a lookup based on an IP address;
   determining that the next hop forwarding entity is referenced only by a device identifier;
   receiving the device identifier as the next hop on the path; and
   determining if a next hop on the path to the destination entity is:
      a bridge having layer 2 forwarding capability based on a device identifier; or
      a router having layer 3 forwarding capability based on a network identifier.

15. The server of claim 14 wherein the device identifier of the forwarding entity defining the next hop is a MAC address and determining the device identifier includes a layer 2 lookup in an ARP database.

16. The server of claim 14 wherein multiple available paths to the destination entity exist, and determining the next hop includes identifying the next hop on each of the available paths for identifying any available path continuity.

17. The server of claim 14 wherein determining the device identifier further comprises:
   performing a layer 3 (L3) lookup; and
   determining, from the layer 3 lookup, the layer 2 (L2) entity corresponding to the L3 forwarding entity returned from the lookup.

18. The server of claim 17 wherein the management application is configured to perform an Address Resolution Protocol (ARP) lookup to identify a L2 identifier associated with an L3 route, the ARP lookup accessing a mapping of IP addresses to Ethernet device identifiers.

19. The network management server of claim 11 wherein said determining the device identifier includes using an arbitrary mapping of an L3 identifier to a corresponding L2 identifier.

20. A computer program product having a non-transitory computer readable storage medium having instructions encoded thereon that, when executed by a processor, perform a method for transmitting diagnostic messages comprising:
   establishing an interface to a network switching environment having a switch fabric of forwarding entities, the forwarding entities including routers having an assigned Layer 3 (L3) network identifiers and bridges having static Layer 2 (L2) device identifiers;
   receiving a network identifier corresponding to a destination entity to which a diagnostic path evaluation is requested, the network identifier identifying a network entity reachable by the path;
   determining a device identifier corresponding to a forwarding entity defining a next hop on the path, wherein determining the next hop device identifier comprises:
      performing a lookup of network identifiers indicating successive forwarding entities on the path; and
      computing a device identifier corresponding to the network identifier, wherein each device having an L3 identifier is given a respective L2 identifier such that all L2 devices and L3 devices have a device identifier;
   transmitting only a single diagnostic message addressed to the determined device identifier for receiving a return message indicative of continuity of the path to the forwarding entity; and
   determining, based on received return messages, whether continuity exists on the path to the network entity.

* * * * *